April 10, 1951     G. M. SMITH     2,548,826
DEMOUNTABLE BRUSHING MACHINE
Filed Feb. 26, 1946     2 Sheets-Sheet 1
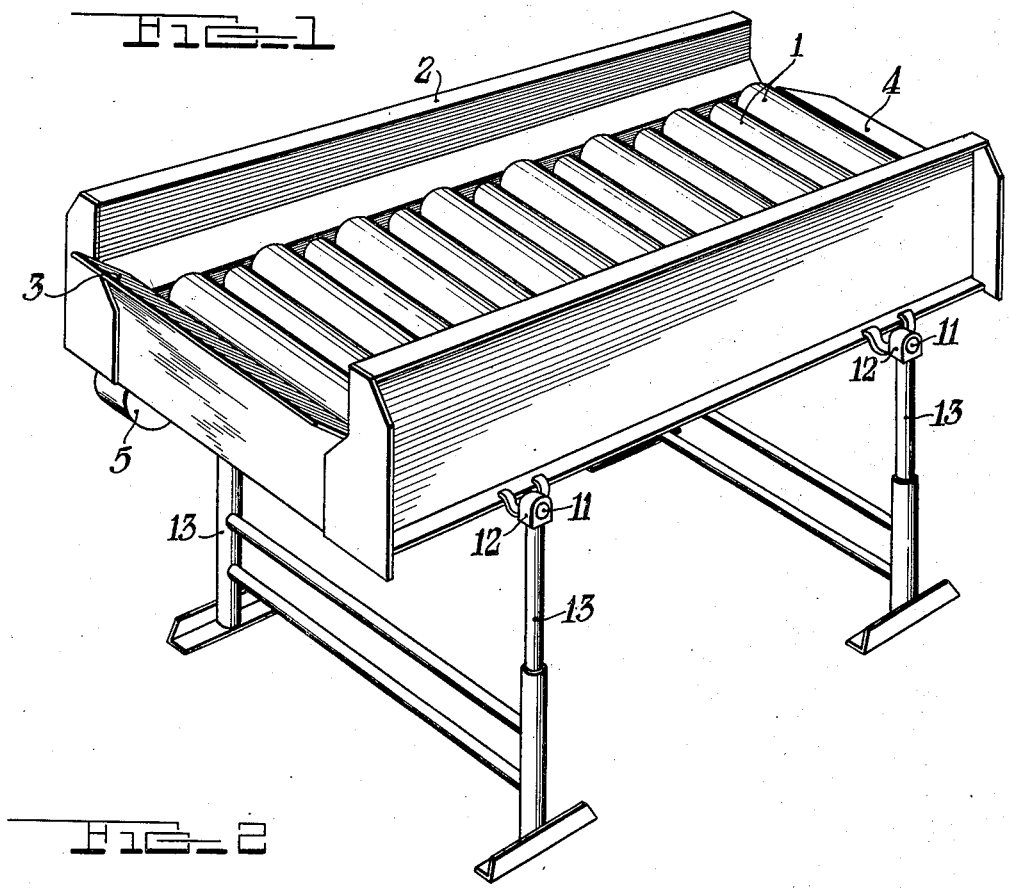
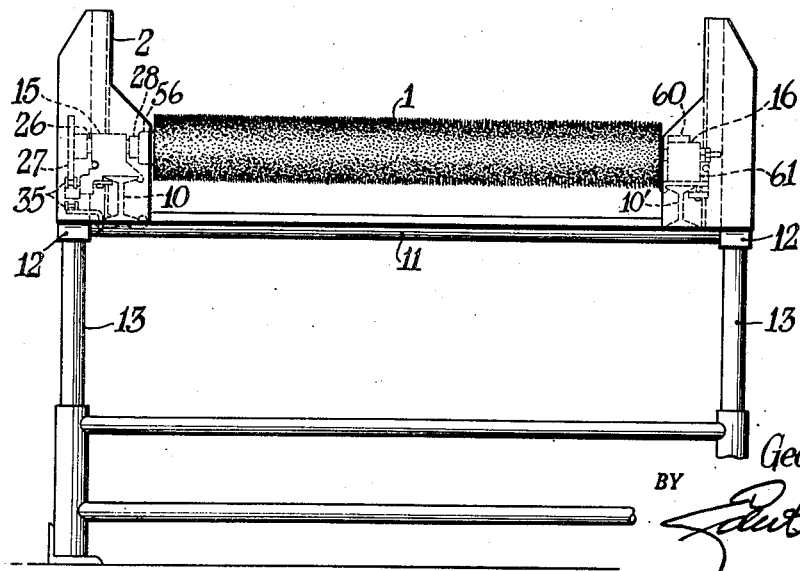
INVENTOR,
George M. Smith;
BY
ATTORNEY.

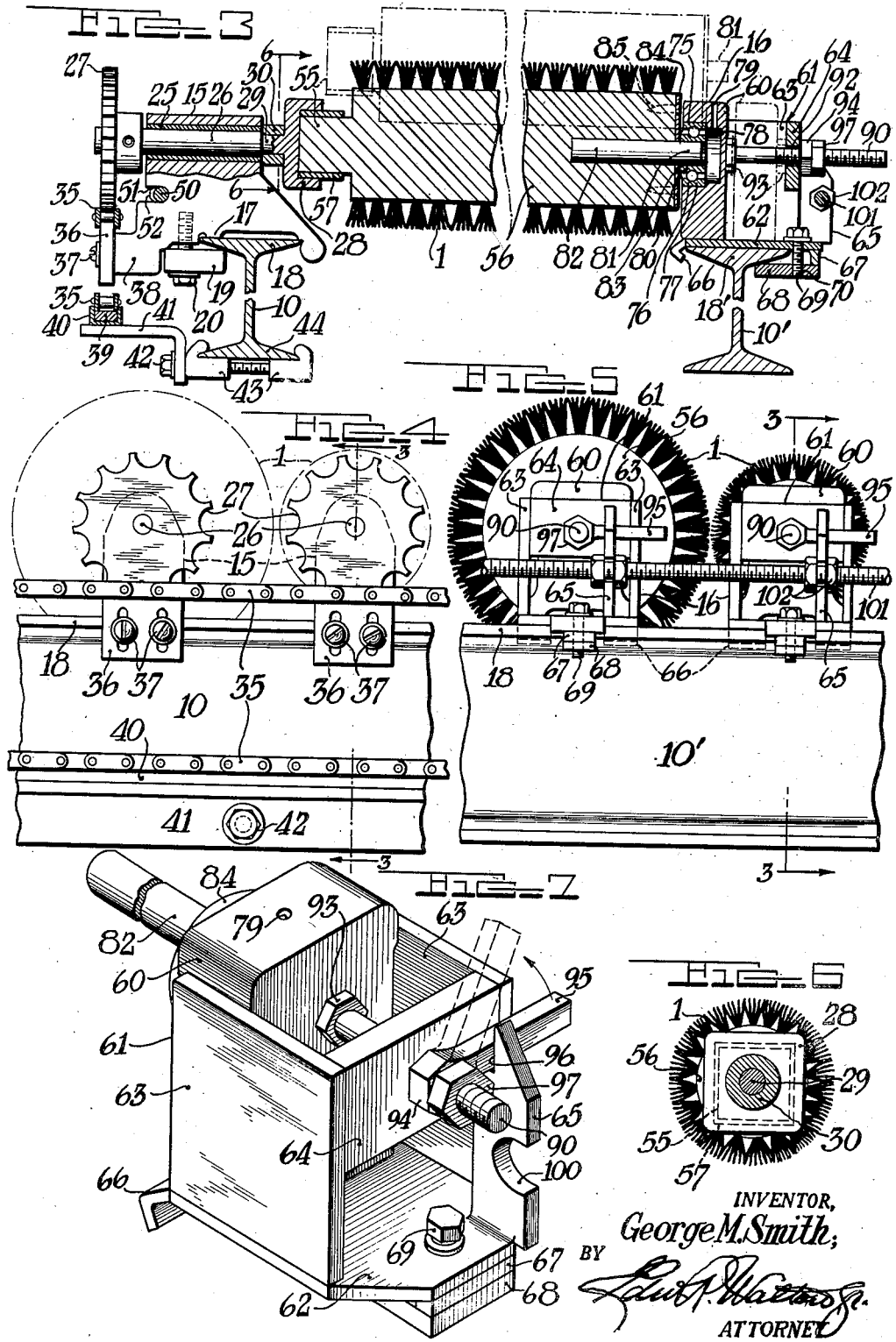

Patented Apr. 10, 1951

2,548,826

UNITED STATES PATENT OFFICE 2,548,826

DEMOUNTABLE BRUSHING MACHINE

George M. Smith, Orlando, Fla., assignor to American Machinery Corporation, Orlando, Fla., a corporation of Florida Application February 26, 1946, Serial No. 650,150

5 Claims. (Cl. 308—59)

This invention relates to fruit or vegetable processing machinery and more particularly to demountable brush supporting arrangements for brushing or buffing equipment.

In the processing of fruit or vegetables for shipment to market the various processing operations are performed by a series of machines which are arranged to pass the fruit from one machine to the next. For instance, the fruit is initially dumped on a slat conveyor which transports it to a washing machine, usually of the spray type, thence to a sterilizing bath, after which it is transported over a drip conveyor to remove excess surface liquid, from which it passes through a drier, then possibly into a waxing machine and thereafter a buffer for giving the surface of the fruit a high polish. Several of these machines, such as the spray type washers, the buffers and, sometimes, the driers and waxers, comprise conveyor beds formed of rotary mounted driven cylindrical brushes arranged in parallel relationship and slightly spaced apart to provide grooves or runways therebetween for holding or supporting the fruit while simultaneously scrubbing, brushing or polishing its surface. In some machines the brushes are arranged longitudinally of the direction of fruit travel so that the fruit is propelled along the grooved runways formed between the brushes, whereas, in other machines the brushes are arranged transversely of the direction of fruit travel and the fruit is moved across the brushes from groove to groove. The latter type of machine is employed herein for the purpose of illustrating the present invention, however, it is equally applicable to either type of machine, as well as to machines employing rollers instead of brushes.

In the machines comprising brushes, frequent stoppages result because of the necessity of replacing worn, damaged or ineffective brushes. The large amount of fruit conveyed on the brushes results in considerable wear, and, consequently, their normal life is rather short. Furthermore, brushes which are employed in washers are subjected to the additional effects of the water and acids used in the washing solutions. In addition, when brushes are used in conjunction with waxing machines, even though they may be part of a separate machine, such as a polishing machine, they collect a considerable amount of wax between their bristles, even to the extent that they are completely ineffective in performing their assigned function. As it has not been possible to cure these difficulties by improvements or variations in the machines, or the brushes employed therein, the processor has been forced to shut down the machines, frequently during a rush period of operation, to replace the brushes with new or clean brushes. In the machines presently in use the structure is such that an undue amount of time is consumed in effecting these replacements.

In an effort to overcome the hereinbefore stated defects of the standard apparatus, it has been proposed to provide an arrangement which permits the partial mounting, at any angle, of a brush on one of its bearing supports and then swinging the brush down into axial position between the bearing supports, and completing the mounting by inserting the shaft on which the brush is journaled at the other end. In this arrangement the brush core is provided with sockets in each end, one of the sockets being square to mate with a square end on the drive shaft. The drive shaft is retained in its bearing and its square portion terminates in a rounded end. The brush is positioned at an angle with its square socket seated over the rounded end of the drive shaft. The brush has to be pivoted so that the socket will mate with the squared shaft and then it may be pivoted downwardly to an axial position between the bearing supports while, simultaneously, the brush is moved axially to slide the socket over the mating shaft. A shaft in the opposed bearing support is then moved axially into the socket in the other end of the brush.

While this brush mounting seems relatively simple and easy in theory, it actually is rather difficult due to the fact that the square socket must be turned, while at an angle, so as to permit axial movement of the brush as it is swung downwardly. If the square socket does not mate exactly with the square shaft, it jams and will not slide on the shaft, and consequently, the brush cannot be swung down between the bearing supports. If the socket is slightly enlarged, it will slide on the shaft more readily but that would permit play between the socket and shaft when they are mated, which would cause undue wear and inefficient operation. The average operator becomes annoyed if the brush is not readily mounted and is apt to try to jam it in place, which tends to mutilate the drive shaft as well as the brush socket so that both elements must be replaced. Normally, the cores of the worn brushes are rebristled, rather than discarded, so that additional expense is involved if the sockets are mutilated. This system has not completely solved the problem and leaves much to be desired.

Having in mind the defects of the prior art apparatus, it is an object of the present invention to provide mountings for the cylindrical brushes used in fruit processing machines that may be readily disassembled and reassembled with new brushes replacing the worn or defective brushes. The arrangement should be such that the brushes, or other rotatable members, can be easily placed between the bearing supports and mounted by axial movements only, so that no force, unnatural or multiple movements are necessary. It is contemplated that the brush mountings should comprise a simplicity of operation and economy of design.

In order to overcome the hereinbefore noted defects of the prior art apparatus the present invention, briefly, comprises a cylindrical brush having a pair of stub members extending from each end which are adapted to cooperate with bearing members mounted on spaced rails on opposite sides of the machine, one of said bearing members being slidably mounted and releasably positioned. The brush core at one end is provided with a square extension which is adapted to be seated in a square socket fixed on the end of a stub drive shaft that is supported by a bearing member on one side of the machine. The other end of the brush core has a bore extending axially therein which is adapted to receive a stub shaft having a radially extending flange which is fixed to the end of the brush core. The stub shaft extends a short distance beyond the flange and is adapted to be removably journaled within the inner race of a ball bearing which is carried by a block that is loosely mounted in a slideway and held in forward position by an adjustable latch. The adjustable latch comprises a bolt which is loosely positioned in axially alignment with the brush, the head of the bolt bearing against the slidable bearing block. The bolt is held in forward position by a threaded bar adapted to cooperate with a keeper in the form of an open slot in the slideway.

In operation, the stub shaft is seated in the bore in the one end of the core and the shaft flange affixed to the end of the core. The brush is then aligned with the sockets in the bearing members and moved axially to seat the square end in the square socket on the drive shaft, after which the slidable bearing block is pushed forward in the slideway toward the brush as far as it will go to journal the stub shaft in the inner race of the ball bearing and thereby hold the square ends tightly within its socket. The latch bolt is then shoved forward and the bar carrier thereby pivoted into its cooperating slot in the slideway to prevent its retraction. If the bolt is not adjusted to the proper length it may be readily threaded through the latching bar in the proper direction so that its head will bear against the sliding block and hold it snugly against the adjoining end of the brush, the inner ball race extending axially beyond the face of the block to bear against the flange carried by the cooperating stub shaft to prevent rubbing between the flange and the block. Thus, it will be seen, the brush may easily be mounted by aligning it with its bearing sockets and moving it and the slidable bearing block axially, no twisting or pivoting of the brush out of its axis being necessary to seat it in its bearings.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout, and in which Fig. 1 is a view in perspective of a machine comprising a conveyor bed composed of rotatable elements such as cylindrical brushes.

Fig. 2 is an end view in elevation of the machine.

Fig. 3 is a cross-sectional view taken on lines 3—3 of Figs. 4 and 5.

Fig. 4 is an end view in elevation of the drive end of the rotatable elements with the supporting bearing members and drive system.

Fig. 5 is an end view in elevation of opposite ends of the rotatable elements with the slidable supporting bearing members.

Fig. 6 is a cross-sectional view taken on lines 6—6 of Fig. 3, and

Fig. 7 is a view in perspective of a slidable bearing member.

Referring specifically to the drawings, a vegetable or fruit processing machine of the transverse roller type is shown in Fig. 1 as comprising a conveyor bed formed of a plurality of parallel rollers 1 mounted transversely within a body 2 which is provided at each end respectively, with receiving and delivery chutes 3 and 4. In the present instance the rollers 1 are shown as having alternately large and small diameters. The rollers 1 may be rotated by a driving mechanism motivated by a motor 5. This machine is adapted to be inserted in a line of processing machines with the receiving chute 3 positioned to receive the fruit from the machine immediately in front of it and the delivery chute 4 being arranged to roll the fruit onto the bed of the next machine. As hereinbefore stated, the rollers 1 may be of any desired type but in the present instance the invention is primarily concerned with rollers in the form of cylindrical brushes as better illustrated in Fig. 2.

With reference to Fig. 2 it will be seen that the body 2 is supported by a framework including a pair of longitudinally positioned I-beams 10 and 10' which are supported by cross shafts 11 that in turn are supported by pivotal engagement with the heads 12 of the legs 13. As best shown in Fig. 3 the I-beams 10 and 10' support a pair of bearing members or blocks 15 and 16 in which the brushes 1 are journaled. The bearing block 15 is recessed in its under side to form bearing surfaces 17 to rest on the top cross piece 18 of its supporting I-beam 10. A lug 19 is clamped by a bolt 20 against the under surface of the cross piece 18 to hold the bearing block 15 in position on the rail or beam 10. The block 15 is provided with a sleeve bearing 25 adapted to receive a stub shaft 26 that has a sprocket 27 pinned to its outer end and a cup-shaped socket 28 formed on its inner end. The inner end of the shaft 26, adjacent to socket 28, has a reduced portion 29 to receive a collar 30 to space the socket 28 from the block 15.

The sprocket 27 meshes with a chain 35 that is driven by the motor 5, the sprocket 27 being positioned above the upper run of the chain 35 which is held in contact with the sprocket teeth by a bearing block 36 fixed by screws 37 to an extension 38 of the block 15. The lower run of the chain 35 rides on a non-abrasive member 39 in a slideway 40 which is mounted on a bracket 41 supported by a bolt 42 extending through a pair of opposed clamps 43 secured to the lower cross piece 44 of the I-beam 10. The bearing block 15 is positioned longitudinally of the I-beam 10 by a fixed spacing rod 50 that is seated in a slot 51 in the outer face of the block 15. The rod 50 is threaded and a pair of nuts 52 are threaded thereon against the lateral faces of the bearing block 15 to prevent longitudinal movement thereof.

The sprockets 27 being driven by the chain 35, it naturally follows that the shaft 26 will be driven and, in order to drive the brush 1, the socket 28 must have a non-circular conformation. In Fig. 6 the socket 28 is shown as being square in the present instance and is adapted to receive the square end 55 of the brush core 56. As the core 56 is usually formed of wood, a square band 57 is preferably seated around the square extension 55 to prevent undue wear or deformation thereof. The square extension 55 with its protective band 57 is readily insertable and removable from the socket 28 by an axial movement of the brush 1. It will be understood that the extension 55 and the socket 28 may have any desired conformation that will afford a driving connection.

The bearing block 16, which is also shown in Figs. 5 and 7, comprises a solid block 60 which is loosely mounted in a slideway 61 that is boxlike in structure and consists of a bed plate 62, side plates 63, end plate 64, and an upright 65 extending from the end plate 64. The bed plate 62 has a pair of formed over lugs 66 along its inner edge to hook over the upper cross plate 13' of its supporting I-beam 10'. A spacing lug 67 is fixed to the outer edge of the bed plate 62 to bear against the outer portion of a clamping lug 68 adapted to be clamped against the under surface of the I-beam cross plate 13' by a bolt 69 extending down through the bed plate 62 and threading into an aperture 70 in said lug 68.

The bearing block 60 is provided with a recess 75 for receiving the outer race 76 of an antifriction bearing 77, a lubricant cavity 78 being located behind the bearing recess 75 and having an oil hole 79 extending to the top of the block 60. The inner race 80 of the bearing 77 forms a shaft journalling socket to removably receive the free end 81 of a stub shaft 82 that is seated in a bore 83 extending axially into the adjacent end of the brush core 56. The shaft 82 has a radially extending flange 84 fixed thereto which is adapted to bear against the end face of the core 56 and is preferably attached thereto as by screws 85. It will be noted that the inner race 80 of the bearing 77 extends laterally beyond the outer race 76 and the face of the bearing block 60 with its edge bearing against the radial shaft plate 84 to space the plate from the bearing block 60.

An adjustable and releasable latch means is provided to hold the block 60 in a forward brush journalling position. The latch means comprises a bolt 90 which is loosely carried with an aperture 92 in the cross member 64 of the slideway 61, and is positioned axially with respect to the brush 1, with its head 93 bearing against the back surface of the bearing block 60. The bolt 90 is retained in position by a threaded retaining member 94 having a radially extending bar 95 that is adapted to be received by, and cooperate with a notch or other keeper 96 in the upright extension 65. With the bar 95 positioned in the notch 96, the retainer 94 is held against axial movement with respect to the slideway and thus holds the block in forward position. The bolt 90 may be threaded through the retainer 94 to compensate for any variation in the position of the block 60 when a new brush is inserted. A lock nut 97 is threaded against the member 94 to prevent accidental loosening of the bolt 90 in the retainer 94, due to vibration or the like. The upright plate 65 has a circular notch 100 in its lateral edge to receive a threaded spacing rod 101 on which are mounted a pair of nuts 102 to be threaded on the rod 101 against the opposite sides of the plate 65 and thereby hold the block 16 against movement longitudinally of the I-beam 10'.

The operation of the hereinbefore described mechanism should be obvious but the sequence of steps will be set forth to clarify any uncertainties. To begin with, as fruit is passed over the conveyor bed it rolls over the brushes and momentarily lodges between the rollers in the grooves formed by their converging surfaces. During this time the brushes or rollers scrub, buff, polish or perform on the fruit or vegetables whatever action is the function of the machine in which they are mounted. This action causes considerable wear of the brush bristles so that from time to time the brush mountings have to be moved closer together, or when new brushes are inserted they have to be spaced apart. To accomplish the movement of the brush mountings in the present instance, it is merely necessary to loosen the clamping bolts 20 and 69 and to thread the spacing nuts 52 and 102 along their respective spacing rods 50 and 101 to thereby properly position the respective spacing blocks 15 and 16 on their supporting beams or rails 10 and 10'. When the proper spacing has been accomplished through the medium of the rods 50 and 101, the bearing blocks 15 and 16 may then be secured by the clamping members 19 and 68 by tightening the bolts 20 and 69.

When excessive wear or deformation of the brush requires its replacement, it may be readily effected by swinging the bar 95 upwardly out of the notch 96, as indicated in broken lines in Fig. 7, and withdrawing the bolt 90 through the aperture 92 in the cross member 64 of the slideway 61. The bearing block 60 may then be retracted in the slideway 61, removing the inner race 80 from the extension 81 of the stub shaft 82 seated in the core 56 of the brush 1. The brush 1 may then be moved axially to remove the square extension 55 with its band 57 from the socket 28 on the end of the drive shaft 56. If the replacement brush has not already been fitted with a stub shaft 82, then the screws 85 are withdrawn from the brush just removed from the machine and the shaft 82 with its flange 84 fitted to the new brush and the screws 85 driven into its core. The brush is then aligned axially between the bearing members 15 and 16 and the square end 55, with its band 57, of the new brush is then slid into the socket 28 of the drive shaft 26 by moving the brush axially. The bearing block 60 on the other side of the machine may then be slid forwardly, or axially, until the inner race 80 journals the free shaft end 81 with its outer edge bearing against the radial plate 84. The bolt 90 is then moved forwardly through the aperture 92 of the cross piece 64 and the bar 95 swung down into the notch or keeper 96. If there is a slight variation in the dimensions of the new brush and the block 60 is differently positioned and the bolt does not fit tightly or, conversely, is prevented from moving forward sufficiently to latch the bar 95 in the notch 96, then the bolt 90 may be threaded through the retainer 94 and the lock nut 97 in the proper direction until the bolt head 93 is seated snugly against the back of the bearing block 60 and its lock bar 95 may be seated in the notch 96. It will be noted that the bearing block 60 is movable in the slideway 61 a distance sufficient to accommodate the axial movement of the square end 55 relative to the socket 28 and also the axial movement of the race 80 relative to the shaft end 81. This movement of the block 60 permits the placement of the brush axially between its bearing supports and mounted solely by axial movement, no tilting or twisting being necessary.

Although certain specific embodiments of the invention have been shown and described, it is quite obvious that many modifications thereof are possible. The invention, therefore, is not to be restricted except insofar as is necessitated by the prior art and by the spirit of the appended claims.

That which is claimed as new is:

1. A brushing machine comprising a pair of bearing members mounted on spaced supports, a shaft supported in one of said bearing members having a non-circular socket at its inner end, means at its outer end for driving said shaft, the other of said bearing members being movable axially in a slideway and supporting a bearing which forms a shaft journalling socket, a cylindrical brush including a core having a non-circular extension at one end to conform to and be seated in said non-circular socket and a stub shaft at the other end having an extension which is adapted to be seated in said shaft journaling socket, and a latch for securing the slidable bearing member in adjusted position in the slideway for holding the core extensions in their respective sockets.

2. In an apparatus of the character described, a supporting frame, a stationary bearing block mounted in the frame, a driven stub shaft journaled in the stationary bearing block and having an axial socket of non-circular cross-section in one end, a slideway mounted in the frame in spaced relation to the stationary bearing block, a slidable bearing block mounted in the slideway for movement in a direction co-axial to the stub shaft journaled in the stationary bearing block, the slidable bearing block having an axial bearing socket facing the socket of the said stub shaft, a rotatable work element including a core with a non-circular extension on one end adapted to fit by axial sliding movement in the socket on the said stub shaft, a second stub shaft projecting from the end of the work member core opposite to the non-circular extension for axial sliding engagement with the bearing socket in the sliding bearing block, the slideway being of a construction to permit axial sliding movement of the sliding bearing block to a degree more than equal to the combined axial depths of the two sockets, and a latch for securing the slidable bearing block in its journaling position at minimum spacing from the stationary bearing block.

3. In a device of the class described, a slideway, a bearing block mounted in the slideway for rectilinear sliding movement, the slideway having an aperture in line with the direction of movement of the bearing block and facing the latter, a latch-bolt loosely fitting the said aperture with its head adapted to bear against the bearing block, a retaining member threaded on the latch-bolt outside the slideway for contact with its wall and having a radial arm, a lock nut mounted on the latch-bolt for engagement with the retaining member, and an extension provided on the slideway adjacent to the aperture and having an upwardly opening notch disposed radially with respect to the aperture and adapted to receive and support the arm of the retaining member.

4. A journal mounting for one end of a roller or the like having a journal shaft protruding therefrom, said mounting comprising a slideway having a bottom wall and spaced side walls, a block having a bearing socket adapted to removably and rotatably receive said shaft, said block being slidable in said slideway to move said socket into and out of journalling engagement with the journal shaft of the roller, and means, including a locking device carried on the slideway and releasably engageable with said block, operable to lock said block on said slideway in a position maintaining the bearing socket in journalling engagement with said journal shaft and operable to release said block for movement on the slideway removing said socket from said shaft.

5. A journal mounting for one end of a roller or the like having a journal shaft protruding therefrom, said mounting comprising a slideway having a bottom wall, spaced side walls and a rear wall, a block having a bearing socket adapted to removably and rotatably receive said shaft, said block being slidable in said slideway to move said socket into and out of journalling engagement with the journal shaft, an abutment member mounted on the rear wall of the slideway and movable thereon into and out of abutment against the rear of said block, and means associated with said abutment member operable to releasably lock said member in position abutting against said block when in a position in said slideway maintaining said socket in journalling engagement with said journal shaft and operable to free said block for rearward movement in said slideway and out of journalling engagement with said shaft.

GEORGE M. SMITH.

REFERENCES CITED

The following references are of record in the file of this patent:

UNITED STATES PATENTS

| Number | Name | Date |
| --- | --- | --- |
| 209,195 | Searchrist | Oct. 22, 1878 |
| 1,251,299 | Sockwell | Dec. 25, 1917 |
| 1,320,933 | Brenckle | Nov. 4, 1919 |
| 1,390,343 | Disbrow | Sept. 13, 1921 |